United States Patent [19]

Altenburger

[11] 4,064,372
[45] Dec. 20, 1977

[54] SYSTEMS FOR AND METHODS FOR PBX TOLL RESTRICTION

[75] Inventor: Otto Altenburger, Rochester, N.Y.

[73] Assignee: Stromberg-Carlson Corporation, Rochester, N.Y.

[21] Appl. No.: 653,395

[22] Filed: Jan. 29, 1976

[51] Int. Cl.$^2$ ............................................. H04M 1/66
[52] U.S. Cl. ................................................ 179/18 DA
[58] Field of Search ................................... 179/18 DA

[56] References Cited

U.S. PATENT DOCUMENTS 3,931,476  1/1976  Matthews .................. 179/18 DA X Primary Examiner—William C. Cooper

[57] ABSTRACT

Centralized toll restriction for private branch exchanges (PBXs) is performed by providing first and second memory addresses in the number translator of a central office switching system. The first and second addresses are matched with restricted telephone calls and unrestricted telephone calls, respectively. Those telephone lines of each PBX which are to be restricted are marked in a convenient manner, such as with tip to ground marking, while those telephone lines not restricted are left unmarked. Outgoing trunks between the PBXs and the central office switching system are temporarily marked with an unbalance upon going off-hook on a restricted telephone line, in order to transmit restriction indication to the central office switching system.

6 Claims, 4 Drawing Figures

SYSTEMS FOR AND METHODS FOR PBX TOLL RESTRICTION

BACKGROUND OF THE INVENTION

1. Field of the Invention

This invention relates to methods of and apparatus for centralized toll restriction, wherein the restriction is accomplished in a telephone switching office. More particularly, this invention relates to methods of an apparatus for centralized toll restriction, wherein a plurality of PBX customers are serviced by centralized toll restriction equipment.

2. Technical Considerations and Prior Art

Generally, Private Branch Exchanges (PBXs) are connected to associated central offices by trunks, which allow making telephone calls outside of the PBXs, as may be required in the normal course of busninss. The completion of such calls is usually effected by automatic switching equipment, which can complete calls anywhere within the United States without operator assistance. However, in many instances, it is desirable for PBX customers to restrict the automatic completion of certain toll calls to a group of office codes and to complete other toll calls only with the assistance of an operator.

A common method of restricting such calls is to provide toll restriction equipment which monitors all calls directed outside of a PBX. Toll restriction equipment includes diverters which typically register the first three digits dialed on an outgoing call and compare them with a customer selected file of three-digit directory codes to determine if the call should be completed without operator intervention. If it is determined that operator assistance is not needed, the diverter disassociates itself from the call and allows the call to be completed. On the other hand, if it is determined that the registered digits are not included in the list of allowed codes, the diverter routes the call to an operator, and then disassociates itself from the call in order to service other PBX outgoing calls.

A major problem with the prior art approach is that each PBX is required to have individual toll restriction equipment, which according to the present state of the art is usually located at the customer premises. Changing a list of allowed directory codes in such equipment generally requires adding and removing a number of cross connections. As a result, changing the list of allowed directory codes, as well as normal maintenance, requires dispatching a telephone service technician to customer's premises. This generally consumes a large part of technicians's normal working day and also requires taking a toll restriction system out of service for a period of time, usually during business hours, when it is needed most.

To ease the maintanance problems, the prior art utilizes toll restriction equipment located in central offices. Since these offices often serve a large numbers of PBX customers, who must be furnished with individual call diverter equipment, such arrangements, generally, create space problems in urban central offices, which are usually short of equipment space when the toll restriction service is requested. Since each individual customer requires his own equipment, the space problem is aggravated. This approach is also inefficient, because generally, the individual toll restriction equipment is idle over a longer period of time than it is in use.

Consequently, prior art toll restrictors create maintenance problems when located on the PBX customer premises and create space and efficiency problems when located in central offices.

An attempt at obviating these problems is suggested in U.S. Pat. No. 3,736,383, in which a single call diverter serves a plurality of PBX customers, in order to restrict toll calls. However, with the approach disclosed in this patent, it is necessary to provide the central office controlling the PBXs with additional equipment which, of course, involves the concomitant problems of additional expense and interconnection interference with the existing system. In addition with the approach of that patent, it is not possible for separate phones connected through each PBS to be either restricted or not restricted, because the entire PBX is either restricted or not restricted.

A need, therefore, exists for a toll restriction approach for a plurality of PBXs, which minimizes all of the above-mentioned problems by providing an inexpensive and readily adaptable toll restriction system in the central office.

OBJECTS OF THE INVENTION

In view of these and other considerations, it is an object of the instant invention to provide a new and improved toll restriction system for PBXs.

It is a further object of the instant invention to provide a new and inproved toll restriction system for PBXs, wherein the toll restriction is accomplished in a central office switching system.

It is still another object of the instant invention to to provide a new and improved toll restriction system for PBXs, wherein telephone lines within an individual PBX may be restricted, while other telephone lines within the same PBX are unrestricted.

It is a further object of the instant invention to provide a new and improved toll restriction system for PBXs, wherein it is not necessary to provide a toll restrictor or code restrictor for each PBX.

It is an additional object of the instant invention to provide a new and improved toll restriction system for PBXs, wherein toll restriction is readily accomplished with existing hardware.

It is an additional object of the instant invention to provide a new and improved toll restriction system for PBXs, wherein toll restriction is provided for PBXs with a reduction in installation, maintenance and service costs.

It is a further object of the instant invention to provide a new and improved toll restriction system for PBXs, wherein a multiplicity of PBXs can share the same type of restriction.

It is still another object of the instant invention to provide a new and improved toll restriction system for PBXs, wherein great flexibility is possible with the classes of service available and/or restricted for the various telephone lines of each PBX.

It is another object of the instant invention to provide a toll restriction system in which restricted telephone lines are identified by tip to ground marking, and where trunks seized by marked telephone lines are temporarily marked until the calling number is stored in an available register of a central office.

It is an additional object of the instant invention to provide a new and improved toll restriction system for PBXs, wherein restricted telephone lines have two addresses in the number translator memory of the central office, and wherein one of these addresses has a party bit stored therein, in order to identify the restricted line.

SUMMARY OF THE INVENTION

In view of these and other objects, the instant invention contemplates a toll restriction system for use with PBXs, which are connected to a central office switching network, wherein telephone lines connected through each of the PBXs are selectively marked to distinguish toll restricted telephone lines from unrestricted telephone lines. The restricted telephone lines mark outgoing trunks from the PBX to the central office upon going off-hook, whereas unrestricted lines do not mark the trunk. The central office distinguishes between the marked and unmarked trunks and, therefore, between restricted and unrestricted lines. Restricted calls are intercepted before being transmitted to the called number if the calling number has a restricted class of service.

DETAILED DESCRIPTION

FIG. 1 - PBX ARRANGEMENT

Figure 1:
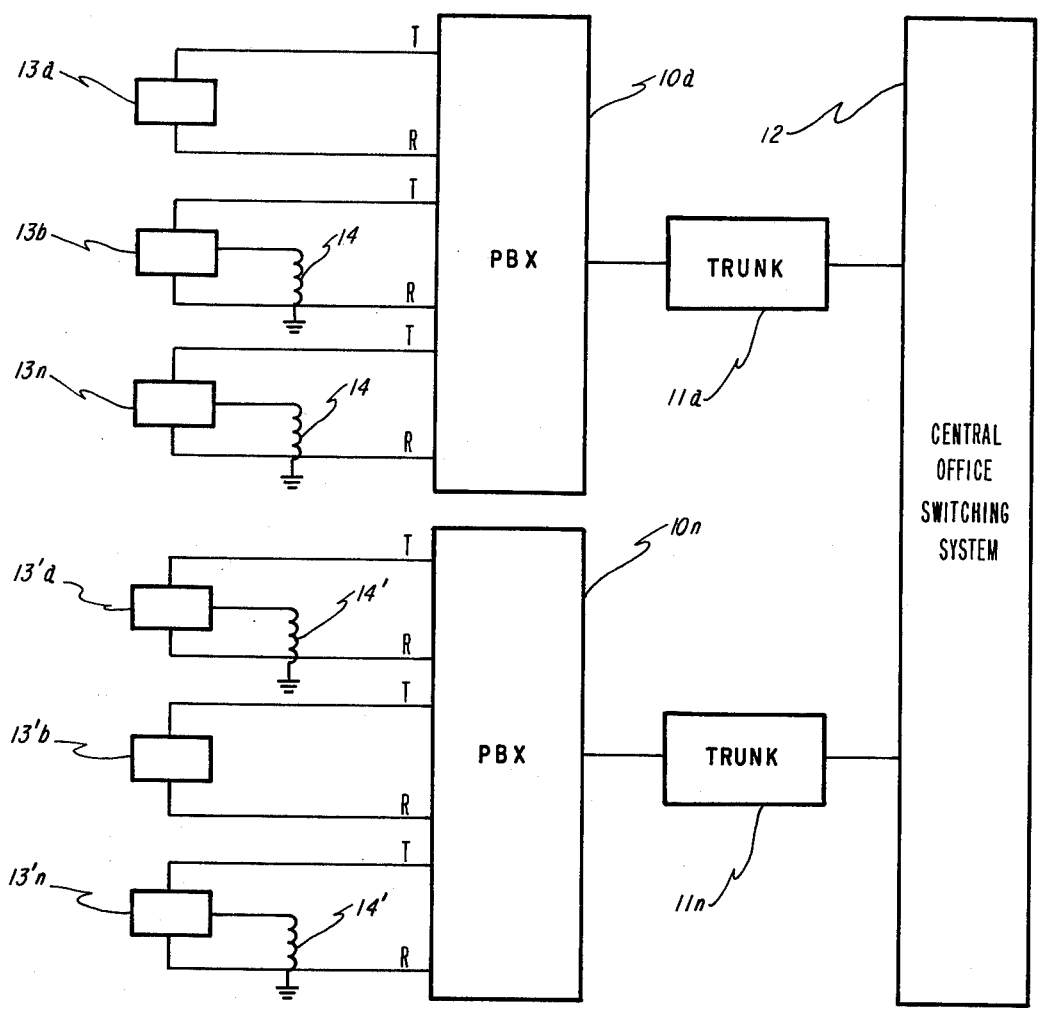
FIG. 1 is a schematic block diagram illustrating a plurality of telephone line connections through individual PBXs to a central office switching system.

Referring now to FIG. 1, there is shown schematically a plurality of Private Branch Exchanges (PBXs) 10a-10n, which are connected via PBX trunk circuits 11a-11n to a central office switching system 12. Each of the PBXs 10a-10n has a plurality of telephone lines 13a-13n connectable therethrough to the central office switching system 12. For the purposes of this description, the telephones 13a-13n are associated with PBX 10a, while the telephone lines 13'a-13'n are associated with the PBX 10n.

In accordance with the principles of this invention, it is desired that some of the telephone lines 13a-13n associated with each of the PBXs 10a-10n be restricted as to calls which can be made, while others of the telephone lines are not so restricted. This is accomplished by marking only those telephone lines which are to be restricted and by not marking the telephone lines not to be restricted. Of the telephone lines 13a-13n connected through PBX 10a, the lines 13b and 13n are marked with tip to ground marking 14, while the phone 13a is unmarked. Of the telephone lines 13'a-13'n connected through PBX 10n, telephone lines 13'a and 13'n are marked with tip to ground marking 14', while telephone 13'b is unmarked. The telephone lines associated with each PBX 10a-10n that are to be restricted are selected by the subscriber on whose premises a PBX is located. The marking may be accomplished by any of the well-known line identifiers. However, for the purposes of illustration, tip to ground marking is utilized.

If the calling telephone line 13 is marked for toll restriction, an unbalance is caused in the line upon going off-hook. This unbalance appears to the central office switching system 12, like a tip party or party-2 identification. If the telephone line 13 making the call is marked then the trunk 11a-11n associated with the telephone is also marked for that particular call. It should be kept in mind that marking of the individual telephones and trunk may be accomplished by any of several well-known marking procedures recognizable by the central office switching system 12. It is only important that those telephone line 13 to be restricted are marked in some convenient manner, while those telephone lines not to be restricted are unmarked.

FIG. 2 GENERAL SYSTEM DESCRIPTION

Figure 2:
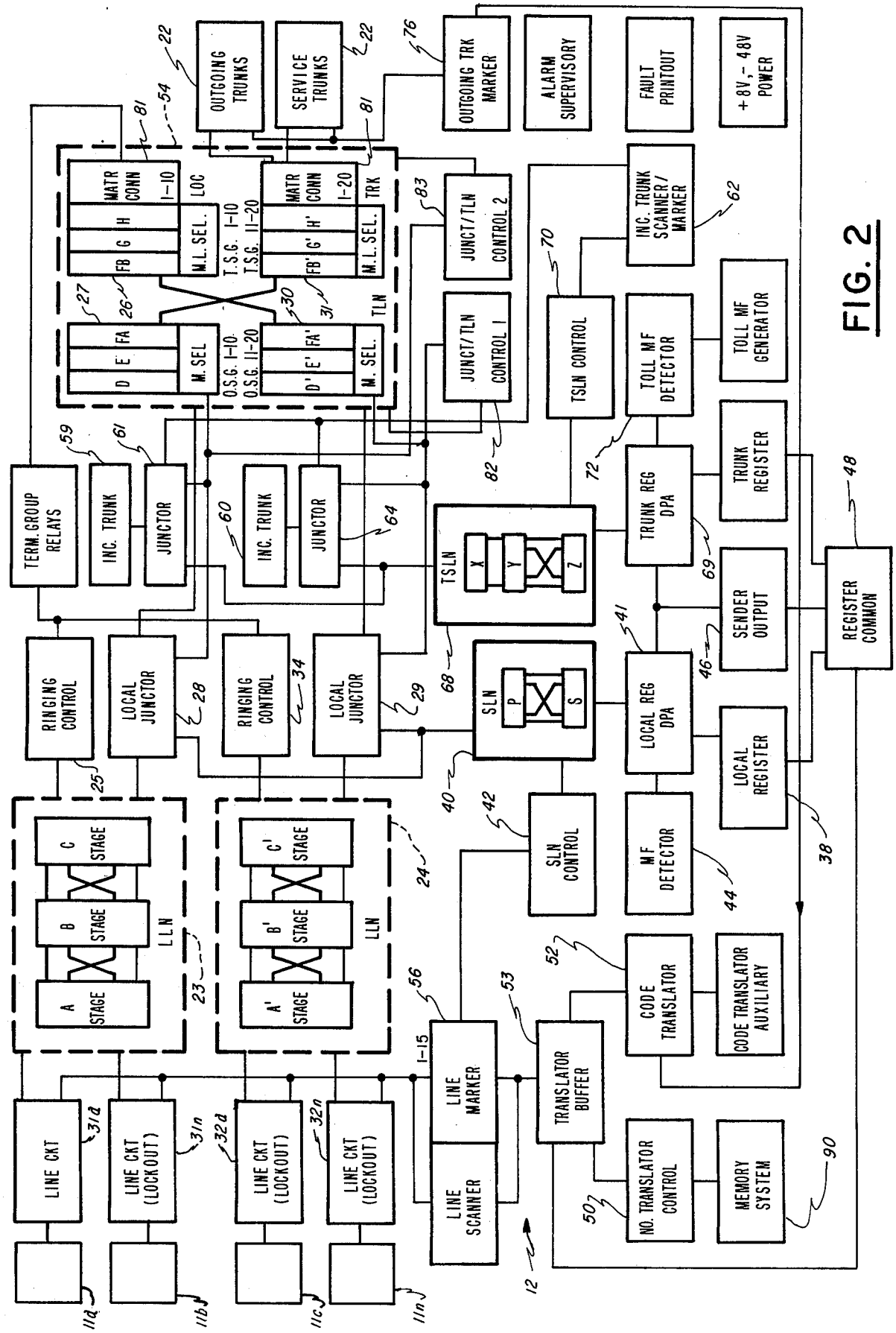
FIG. 2 is a schematic block diagram of an electronic telephone system with which the principles of the instant invention may be utilized.

Referring to FIG. 2, there is shown a block diagram generally illustrating a preferred embodiment of a central office switching circuit 12. The trunks 11a-11n are connected to either line circuits 31a-31n or line circuits 32a-32n. The line circuits 31a-31n are, in turn, connected to the first LLN 23, and the line circuits 32a-32n are, in turn, connected to the second LLN 24. Consequently, there is a first group of telephones and/or PBXs 10a-10b connected to a first LLN 23 and a second group of telephones and/or PBXs connected to a second LLN 24.

The LLNs 23 and 24 function as concentrators for originating line calls and as fan outs for terminating calls. Each LLN 23 and 24 consists of three stages of matrices A, B and C, and are used for both originating and terminating types of telephone traffic. The LLNs 23 and 24 are connected at one end to the plurality of line circuits 31a-31n and 32a-32n, respectively, with varying numbers, depending upon telephone service to be offered. The line circuits 31a-31n and 32a-32n are more fully described in U.S. Pat. No. 3,708,672 entitled Plug-In Line Arrangement, filed June 15, 1971, in the name of Otto Altenburger and is assigned to the assignee of the present application.

Each of the LLNs 23 and 24 provides one unique path between circuits connected to opposite ends of the network. Each of the switching networks in FIG. 2 includes matrix switches comprised of relays, including a mark or control winding for initially actuating the relay and a hold or sleeve coil connected in series with its own contacts for maintaining the relay actuated after the path, through the network, has been established.

The C stages of the LLNs 23 and 24 provide termination for both originating taffic from the line circuits 31a-31n and 32a-32n and incoming traffic to the line circuits. The terminations for the LLNs 23 and 24 are connected to the local junctors 28 and 29 for originating traffic and to ringing controls 25 and 34 for terminating traffic. The number of local junctors and ringing controls provided depends upon the traffic requirement for the system. The ringing controls are more fully described in U.S. Pat. No. 3,671,678, filed on Dec. 22, 1970, entitled R. C. Circuit, in the name of Otto Altenburger and assigned to the assignee of the present invention.

The local junctors 28 and 29 serve as focal points for all originating type traffic. The local junctors 28 and 29 include provisions for connecting the line circuits 31a-31n and 32a-32n to a local register 38 via a service link network (SLN) 40 and a local register dial pulse acceptor (DPA) 41. In addition, the local junctors 28 and 29 provide transmission battery for calling and called parties on intraoffice calls. The local junctors 28 and 29 are under the control of the calling party and, when trunk or station busy conditions are encountered, the local junctors provide the busy tone to the calling party.

In order to connect one of the calling line circuits 31a–31n or 32a–32n to the local register 38 through one of the associated local junctors 28 and 29, the SLN 40 includes two stages of matrices (P and S) and is controlled by a SLN control circuit 42. As is set forth in co-pending U.S. Pat. application, Ser. No. 638,443, filed Dec. 8, 1975, entitled Systems for and Methods of Terminating Calls, the local register 38 includes four register groups A, B, C and D, each of which includes 60 separate subregisters. Accordingly, there are a total of 240 subregisters in the local register 38. Upon connecting the local register 38 (or rather one of the 240 subregisters therein) to one of the local junctors 28 or 29, dial tone is provided. In addition, the local register 38 includes the apparatus for acting on the subscriber instructions. The local junctors 28 and 29 terminate on the P stage of SLN 40 and the DPA 41 terminates on the S stage of the SLN. The DPA 41 functions as in interface between the local junctors 28 and 29 and the local register 38. Furthermore, the DPA 41 provides dial tone to the calling subscriber, detects rotary dial pulses, and sends the pulses to storage sections in the local register 38. In the event of multifrequency signalling by the subscriber, the frequencies are detected by an MF detector 44 connected to the DPA 41.

In order to provide outpulsing, a sender 46 is provided. Both the local register 38 and the sender 46 are controlled by a register common 48. The local register 38 is connected to the register common 48 on a time division multiplex basis, wherein information is passed from one equipment to the other on a common bus. The register common 48 is also connected to a number translator 50 and a code translator 52 on a time division multiplex basis. The circuits of the number translator 50 and code translator 52 provide information, such as equipment number, ringing codes and class of service (COS). The number translator 50 and the code translator 52 are connected through a translator buffer 53 to a line scanner-marker circuit 56, which includes circuitry to detect service requests and circuitry to access the individual line circuits 31a–31n and 31a–32n.

The ringing controls 25 and 34 associated with the first and second LLNs 23 and 24 connect ringing generators to terminating or called stations, detect off-hook conditions (ring-tip) of the called stations, and provide ring back tone for the calling station. Each of the line circuits 31a–31n and 32a–32n can be connected to any of a plurality of ringing controls, which have access from a trunk line network (TLN) 54, so that a ringing control is automatically connected to the terminating line circuits, as soon as the connection to that line is complete.

A circuit within the line scanner-marker circuit 56 continuously checks the line circuits 31a–31n and 32a–32n for an off-hook condition. As previously stated, the line circuits 31a–31n and 32a–32n are more fully described in U.S. Pat. No. 3,708,672. The line scanner-marker circuit 56 is used for both the originating and terminating types of traffic. In the event or originating traffic, a line scanner in the circuit 56 stops when an off-hook condition is detected and transmits the information from its counter circuits to a marker circuit in the circuit 56 to mark the particular line circuits 31a–32n. This enables the SLN control 42, which then initiates a path finding operation between an available subregister within the local register 38 and the line circuit requesting service. In the event of terminating traffic, the line scanner is controlled by the number translator 50, wherein the line scanner-marker circuit 56 receives an equipment number from the number translator 50 to mark the line circuits 31a–31n or 32a–32n with the particular equipment location. Furthermore, in terminating traffic, the line marker portion of the circuit 56 is also involved in transmitting the terminating subscriber class of service, ringing codes, busy or idle status and types of ringing required through a pair of junctor controls 57 and 58 to the ringing control 25 and 34, respectively. The line scanner-marker circuit 56 is more fully described in U.S. Pat. No. 3,699,263 entitled Line Scanner and Marker Using Group Scanner, filed Dec. 23, 1970, in the names of Gunter Neumeier and Otto Altenburger and assigned to the assignee of the present invention.

In operation, when a telephone 21a–21c goes off-hook, the line scanner-marker circuit 5 detects the off-hook condition and marks the line circuit connection to the A stage of whichever LLN 23 or 24 the telephone is connected to. Simultaneously, the line scanner-marker circuit 56 signals the SLN control 42 to begin its path finding process for connecting the marked line circuit to a subregister within the local register 38. The SLN control detects and locates the path in a three-step scanning process. The first scan locates the existence of a free path from a free subregister within the register 38 to the line circuit and identifies the free subregister and its corresponding stage S matrix module. The second scan identifies the free path through a P stage matrix module. The third scan identifies the free local junctor 28 or 29 depending on which LLN 23 or 24 is involved. The connection of the free local junctors 28 or 29 to the associated LLN 23 or 24 and the connection through the SLN 40 are now completed. When the path finding process is complete, the selected matrix relay coils in the LLN 23 or 24 and the SLN 40 are energized. The metallic connections through the tip and ring leads are checked. If the connection is complete, the sleeve coil connections are completed and the connected local junctor 28 or 29 is seized. At this time, the SLN control 42 releases the line scanner-marker circuit 56 and the local register 38 is connected to the subscriber to receive dial information. Once the subscriber information has been dialed into the local register 38, the call must be routed, either internally to another local subscriber or externally via an outgoing trunk 22 to another exchange.

Incoming calls from other exchanges are applied to one of a pair of incoming trunk circuits 59 or 60. An incoming trunk scanner-marker circuit 62 continuously scan the incoming trunks 59 and 60 looking for a seized incoming trunk circuit. When a seized incoming trunk circuit is located, a scanner circuit stops its scanning and transmits the trunk equipment number to a marker circuit, identifying the particular incoming trunk (both the scanner and marker circuits are identified by the numeral 62). The incoming trunk circuits 59 and 60 are each connected to trunk junctors 61 and 64, respectively, which are essentially identical to the local junctors 28 and 29, but which are connected between the incoming trunks 59 and 60 and the LTN 54 and a trunk service link network (TSLN) 68. The trunk junctors 61 and 64 function as focal points for all incoming type traffic and include provisions for connecting the incoming trunks 59 and 60 to any of a plurality of trunk registers 66 within a register group.

The junctors 61 and 64 are connected through the TSLN 68 and a trunk dial pulse analyzer (TDPA) 69 to the trunk register 66. The trunk junctors 61 and 64 also provide incoming and called parties with transmission battery and, when encountering either trunk or station busy conditions, return a busy tone to the incoming call. A trunk service line network (TSLN) control 70 functions to locate a path between the trunk junctors 61 and 64 and the trunk register 66. The tunk junctors 61 and 64 are terminated on the stage X matrix modules of the TSLN 68, while the trunk register 66 and TDPA 69 are terminated on the Z stage matrix modules. The TSLN 68 is divided into a number of separate grids. The incoming trunk scanner-marker circuit 62 signals the TSLN control 70 as to which of the grids will be used for accessing one of the subregisters within the register 66, as determined by the trunk junctor 61 or 64 involved in the connection. A multifrequency detector 72 is connected to the trunk register 66 through the TDPA 69.

The subregisters of the trunk register 66 are controlled by the register common 48, which communicates with the number translator 50 and code translator 52 on a time division basis. The code translator 52 is connected to an outgoing trunk marker circuit 76 in order to identify outgoing trunk groups 22. The outgoing trunk marker circuit 76 is more fully described in U.S. Pat. application, Ser. No. 103,267, filed Dec. 31, 1970, entitled Outgoing Trunk Marker, filed in the names of Otto Altenburger and David Stoddard and assigned to the assignee of the instant invention: now U.S. Pat. No. 3,732,377. The sender circuit 46 provides outgoing pulsing for the subregisters of the trunk register 66 as well as for the subregisters of the local register 38.

Since the trunk junctors 61 and 64 are identified by the incoming trunk scanner-marker circuit 62, only a two-step scan is required in the path finding scheme of the TSLN control 70. In the first scan, a free path is detected between a free subregister within the trunk register 66 and the seized trunk junctor 61 or 64, thereby identifying a free trunk subregister. The connected Z stage matrix module is also thereby identified. The next scan locates a free path through the X and Y stage matrix modules to the marked trunk junctor 61 or 64 and energizes the mark relay coils through the Y and Z stage matrix modules and also energizes the mark relay coils through the Z stage matrix module to the marked trunk subregister. When the connection between the trunk junctor 61 or 64 and the trunk register 66 is completed, the metallic connections through the tip and ring leads are checked and then the sleeve connections are completed. The TSLN control 68 and the incoming trunk scanner-marker circuit 62 are now released. Once the incoming information has been received by one of the subregisters in the trunk register 66, the call is either routed internally to a local subscriber or externally to other exchanges via the outgoing trunk 22.

The TLN 54 provides for the termination of the local traffic to the local subscribers, the termination of incoming calls from other exchanges to the local subscribers, and for the connection of incoming calls from other exchanges to other external exchanges. The TLM 54 includes E and E stage matrices. However, as shown, additional matrices, such as FA, FD, G and H matrices, are included. Generally, the D stage provides the entrance to the TLN 54 and is connected to the local junctors 28 and 29 and the trunk junctors 61 and 64. In the illustrated embodiment, the TLN 54 is divided into two groups of matrices, which for purposes of convenience may be described as Super Group I matrices and Super Group II matrices. The Super Group I matrices in the TLN 54 and the Super Group II matrices are controlled by a junctor/TLN controls 82 and 83. The junctor/TLN controls 82 and 83 are required to complete the terminating portion of a telephone call, whether it is internally terminated call or an outgoing call to a distant office. As will be further explained hereinafter, and is schematically shown in FIG. 1, the number translator 50 is divided into two independent sections 50a (regular) and 50b (standby). The code translator 52 is likewise divided into two independent sections 52a (regular) and 52b (standby).

The number translator 50 and the line scanner-marker circuit 56 are used to complete calls to local line circuits 31a–31n and 32a–32n. On the other hand, the code translator 52, together with the outgoing trunk marker circuit 76 completes calls to the trunk 22. The path finding scheme of the junctor/TLN control 82 includes a two-step scan. The local junctors 28 and 29 or the trunk junctors 61 and 64 have been previously marked (depending upon whether it is an incoming call or locally generated call). Furthermore, the information in the local register 38 or trunk register 66 is transmitted from these registers via the register common 48 to either the number translator 50 or the code translator 52, depending upon whether it is a call terminating to a local subscriber or a call going to a distant exchange, respectively. In the event of a call terminating to a local subscriber, the number translator 50 via the line scanner-marker circuit 56 marks the line circuit of the terminating call. In the event of an outgoing call, the code translator 52 via the outgoing trunk marker circuit 76 marks the particular outgoing trunk group 22. The first scans of the junctor/TLN controls 82 and 83 detect free paths through the TLN 54. These free paths go to either a marked outgoing trunk 22 or via the ringing circuits 25 and 34 and the LLNs 23 and 24 to a line circuit 31a–31n or 32a–32n. In addition, the E stage module is identified (the stage D module was identified by the seized local or trunk junctor). The next scan of the junctor/TLN controls 82 and 83 identifies and marks the input to the F stage modules. The subsequent scan also completes the connections back through the D and E stage modules to the marked junctor by energizing the matrix mark relay coils and also provides power through the F stage module and the associated LLN 23 or 24 to energize the mark relay coils. After a metallic path check is made via the tip and ring leads, the sleeve connections are picked up to complete the connection through the TLN 54.

The activated ringing control 25 or 34 now rings the called party. The connections through the LLN 23 or 24 and the TLN 54 and through the local junctors 28 and 29 or trunk junctors 61 and 64 are maintained during the call under the control of the calling party. When the calling party hangs up, all the connections are broken. In the event the calling party still remains off-hook after the called party hangs up, provisions are included in the junctor circuits 28, 29 or 61, 64 so that the connections are broken after a preset period of time.

Figure 3:
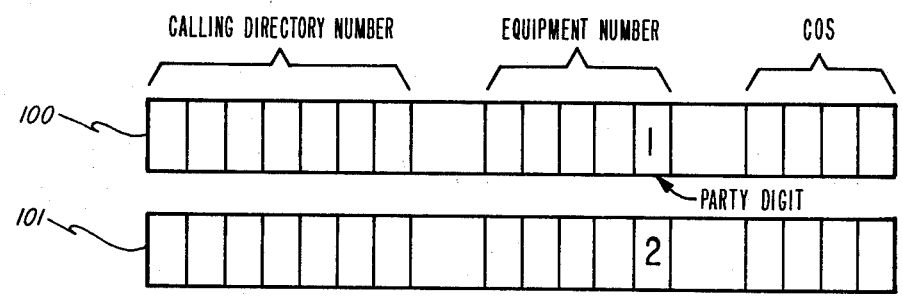
FIG. 3 is a schematic illustration of a pair of memory addresses in the number translator memory of FIG. 2, which are associated with each PBX telephone line.

FIGURES 2 and 3 - TOLL RESTRICTION OPERATION

In order for the central office switching system 12 to perform a toll restriction operation on calls from the telephone lines 13, a pair of addresses 100 and 101 is provided for each telephone line associated with a PBX. As is seen in FIG. 3, the addresses 100 and 101 are identical as to calling directory number and equipment number. However, in the address 100 a party-1 digit is stored with the equipment number, whereas in the address 101 a party-2 is stored with the equipment number. The address 100 has an unrestricted class of service, whereas the address 101 has a restricted class of service. If the telephone 13 making the call is marked with party-2 marking, such as as lines 13b and 13n, then the call will be matched with address 101 and will be restricted. If the call is placed on a telephone, such as 13a, which is unmarked, then a match will be made with address 100 and the call will be unrestricted.

When a telephone set connected to one of the telephone lines 13a–13n (FIG. 1) connected through one of the PBXs 10a–10n (FIG. 1) goes off-hook and dials digits indicating a call outside of the PBX, an outgoing PBX trunk 11 connected to the central office 12 is seized. The line circuit 31 then provides a signal to the line-scanner 56 indicating an off-hook condition of one of the telephone lines 13a–13n. The scanner 56 has hundreds and tens counters which continually search groups of line circuits 31 for an off-hook signal. When an off-hook signal is detected, the hundreds and tens counters of the scanner 56 are stopped and a units counter in the count scanner is started. Upon matching the units digit of the off-hook line circuit, the units counter is stopped, which causes a marked path to the associated LLN 23 or 24. The position of the counters represented by hundreds, tens and units is the line equipment number. The line scanner 56 also detects whether there is a party to bit associated with the off-hook telephone. If the telephone which is off-hook is, for example 13b or 13n, associated with PBX 10a, then there will be a party-2 bit indicating toll restriction. However, if the telephone off-hook is 13a, then there will be no party-2 bit. The equipment number will, therefore, either have a 1 or a 2 associated therewith.

The line marker portion of the line scanner-marker circuit 56 signals the SLN control 42 to connect the calling line to the local register DPA 41, which indicates to the SLN 40 whether or not there is an idle subregister within the local register 38. The DPA 41 also returns dial tones to the calling subscriber. If there is a local register 38 available the complete equipment number and the bit indicating whether the call is restricted or not restricted are forwarded through the associated LLN 23 or 24, local junctor 28 or 29, and SLN 40 for temporary storage in the local register.

After the equipment number and restriction bit are stored temporarily in the register 38, it is forwarded through the register common 48 by means of time slot pulses and into the translator buffer 53, which stores the number until the number translator control 50 can activate scanning of the memory system 90, in which the dual address of FIG. 3 is stored. If the equipment number, stored in the local register, matches address 100, then there will be no toll restriction. If the equipment number matches address 101, then there will be a toll restriction.

The determination, as to whether or not there will be a toll restriction, is made before the called number is dialed by the off-hook telephone line 13. Generally, after the first three digits are dialed, a translation is made to determine whether the call is a local call or whether the call is a local-to-trunk call and will be sent out over an outgoing trunk 22. If the call is a trunk call, it is recognized by a type of call detector in the register common 48, which determines whether or not the call is a trunk call. The type of call detector then directs the code translator 52 to examine the called directory number, as the number is dialed and stored in the register 38. For each telephone line 13 of each PBX, area codes or office codes are combined with an assigned class of service, which may include a multiplicity of classes of service. If the class of service, assigned to the particular PBX telephone line 13 making the call, does not match the area or office code, the subscriber who has dialed the call will be intercepted, if the line is marked and therefore restricted.

FIG. 4-PBX TRUNK CIRCUIT WITH MARKING

Figure 4:
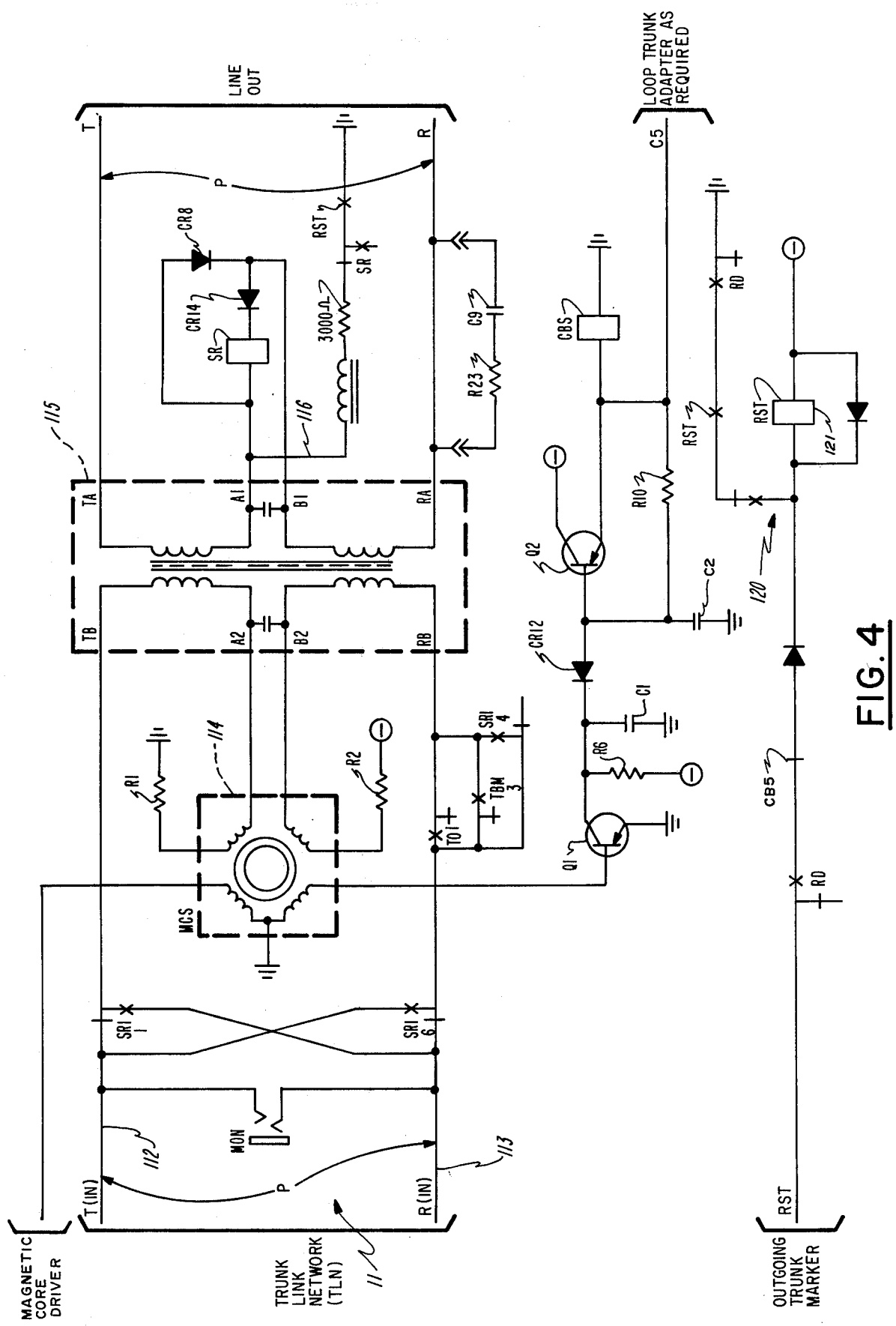
FIG. 4 is a schematic circuit diagram of an outgoing trunk extending between a PBX and central office, including a schematic diagram of toll restriction marking for that trunk.

Referring now to FIG. 4, there is shown a PBX trunk circuit 11, which is generally of a known configuration, but which includes provision for party-2 type marking. The trunk circuit 11 is connected at one end to a PBX 10 and at the other end to a line circuit 31 or 32 in the central office switching system 12. Typically, the PBX trunk circuit 11 includes tip and ring leads 112 and 113 and isolating transformers 114 and 115. The isolating transformer 114 isolates trunk 111 from other trunks and lines, while the isolating transformer 115 splits the circuit into a signal loop and a talking loop. The signal loop is marked by a trunk marker 116, which includes an impedance and a pair of contacts SR and RST. The contact RST applies a mark to the line when closed, while the contact SR removes the mark after the mark is no longer necessary.

Typically, the contact RST is connected to a number of circuits 120, which are associated with those telephone lines 13a–13n, which are to be restricted, for example, telephone lines 13b and 13n. Upon going off-hook, a relay 121, associated with each telephone which is restricted, closes the contact RST, marks the trunk circuit, and thus informs the central office 12 that the telephone line placing the call is restricted.

After sufficient time has elapsed to inform the central office of the toll restriction, the contact SR is opened to removed the mark. The contact SR may be opened by any convenient arrangement, but generally the contact is open when the register 38 in the central office 12 has received the calling number from a register in the PBX, and generates a signal indicating reception of the calling number. Generally, the register takes about 25 milliseconds to register the calling number, so that the mark or restriction can be removed quite quickly. An interval of 100 milliseconds would, therefore, certainly provide enough time to register the restricted calling number. After the restriction is removed from the trunk 11, the trunk 11 is available to process a subsequent restricted or unrestricted call. Since the mark is applied and removed so rapidly, the trunk 11 is able to service the numerous individual telephones 13a–13n, associated with the particular PBX 10 which it services.

The foregoing description is merely illustrative of the invention which is to be limited only by the following claims:

What is claimed is:

1. A toll restriction system for use with private branch exchanges connected to a central office switching system, said toll restriction system comprising:
- a group of telephone lines connected through each of said private branch exchanges;
- means for marking selectively individual telephone lines within each group of telephones, wherein said marking distinguishes toll restricted telephone lines from unrestricted telephone lines;
- trunk means for connecting each private branch exchange to said central office;
- means, arranged to be energized, for marking said trunk means upon connecting a marked line to said trunk means via a said private branch exchange;
- means within said central office switching system for distinguishing between marked and unmarked trunk means and, therefore, between restricted and unrestricted telephone lines;
- means for intercepting calls made via restricted telephone lines before said restricted telephone lines are connected to a called destination; and
- means for transmitting unrestricted calls to called destinations.

2. The toll restriction system of claim 1, wherein said means for distinguishing between marked and unmarked trunk means includes:
- a memory having first and second addresses for each telephone line, wherein the addresses have identical equipment numbers, and wherein the second address has a party digit stored with the equipment number and the first address has no party digit stored with the equipment number; and
- means for associating unrestricted telephone lines with a said first address and restricted lines with a said second address, the presence of a party digit in a said address associated with a said restricted party digits being operative to energize said means for marking a said trunk means.

3. The toll restriction system of claim 1, further including means for removing the mark from the trunk after the calling number is registered in the central office switching system.

4. A method of restricting service available to selected telephone lines which are connected through a private branch exchange that is connected to a central office switching system, said method comprising the steps of:
- marking those telephone lines which are restricted;
- marking an outgoing trunk connecting the private branch exchange to the central office switching system with an unbalance upon attempting to connect a call via a restricted telephone line;
- detecting the unbalance in the central office; and
- restricting in the central office switching system the service available to the restricted telephone line.

5. The method of claim 4, wherein the step of restricting in the central office switching system includes the steps of:
- providing a memory within the central office switching system with a plurality of first addresses and a plurality of second addresses, wherein the first addresses are associated with unrestricted lines, and the second addresses are associated with restricted lines;
- associating unmarked telephone lines with the first addresses, and marked telephone lines with the second addresses; and
- restricting the service of those telephone calls on lines matched with the second addresses.

6. The method of claim 5, wherein the restricted telephone lines are marked as party lines and the resulting unbalance in the incoming trunk is indicative of a party line telephone call, and wherein the first addresses in the memory include no party digits, while the second addresses in the memory include party-2 digits so that the memory recognizes restricted telephone calls.

* * * * *